United States Patent
Franke et al.

(10) Patent No.: US 7,187,435 B2
(45) Date of Patent: Mar. 6, 2007

(54) ERROR FUNCTION ANALYSIS OF OPTICAL COMPONENTS

(76) Inventors: Jorge Eduardo Franke, 5815 Meadow Dr., Orefield, PA (US) 18069; John Sargent French, 23 Fetterman Rd., Palm, PA (US) 18070; Sheldon Louis Sun, 3616 Aster St., Allentown, PA (US) 18031; William Joseph Thompson, 9671 Oakview Rd., Kempton, PA (US) 19529

(*) Notice: Subject to any disclaimer, the term of this patent is extended or adjusted under 35 U.S.C. 154(b) by 0 days.

(21) Appl. No.: 10/348,904

(22) Filed: Jan. 23, 2003

(65) Prior Publication Data

US 2003/0112425 A1   Jun. 19, 2003

Related U.S. Application Data

(63) Continuation of application No. PCT/US02/09365, filed on Mar. 27, 2002.
(60) Provisional application No. 60/279,550, filed on Mar. 29, 2001.

(51) Int. Cl.
   *G01N 21/00*   (2006.01)

(52) U.S. Cl. .................................... 356/73.1
(58) Field of Classification Search ............... 356/73.1; 385/1–5, 15–52; 398/9–26
   See application file for complete search history.

(56) References Cited

U.S. PATENT DOCUMENTS

| | | | |
|---|---|---|---|
| 3,892,494 A | | 7/1975 | Baker et al. |
| 5,548,399 A | * | 8/1996 | Takai et al. ................. 356/218 |
| 5,566,088 A | | 10/1996 | Herscher et al. ........ 364/514 B |
| 5,579,145 A | | 11/1996 | Bogdan et al. ............. 359/189 |
| 5,652,668 A | | 7/1997 | Aulet et al. ................. 359/110 |
| 5,808,760 A | | 9/1998 | Gfeller |
| 5,841,667 A | | 11/1998 | Martin .................. 364/551.01 |
| 5,870,211 A | | 2/1999 | Yoshida |
| 6,201,600 B1 | | 3/2001 | Sites et al. |
| 6,259,543 B1 | * | 7/2001 | Golovchenko et al. ....... 398/26 |
| 6,304,350 B1 | * | 10/2001 | Doerr et al. ................... 398/9 |
| 6,373,563 B1 | | 4/2002 | Stimple et al. |
| 6,851,086 B2 | | 2/2005 | Szymanski |

* cited by examiner

*Primary Examiner*—Tu T. Nguyen

(57) ABSTRACT

An error analysis tester for an optical component includes an optical transmitter, an optical attenuator, a port, a receiver, a processor and a graphical display. The optical transmitter and optical attenuator produce a test signal at a plurality of selected optical power levels. The port is configured to output the test signal to the optical component and to receive a version of the test signal from the optical component. The receiver determines errors in the received version of the test signal. The processor determines data points of a function associated with an error rate at each of the selected power levels and a line corresponding to the data points. The graphical display produces a visual plot of the data points and the corresponding line.

17 Claims, 8 Drawing Sheets

$$f(BER) = \log_{10}\left(\sqrt{2}\, \text{erfc}^{-1}(2 \cdot BER)\right)$$

$$f(BER) = \log_{10}\left(\sqrt{2}\, erfc^{-1}(2 \cdot BER)\right)$$

ERROR FUNCTION ANALYSIS OF OPTICAL COMPONENTS

CROSS-REFERENCE TO RELATED APPLICATIONS

The present application claims priority under 35 U.S.C. § 120 and 35 USC § 365(c) from International Patent Application Ser. No. PCT/US02/09365 filed on Mar. 27, 2002, and under 35 U.S.C. § 119(e) from U.S. Provisional Application Ser. No. 60/279,550 filed Mar. 29, 2001. These applications are assigned to the present assignee. The disclosures of these applications are specifically incorporated herein by reference.

BACKGROUND OF THE INVENTION

1. Field of the Invention

This invention relates generally to optical communication systems. In particular, the invention pertains to error analysis of optical components in optical communication systems.

2. Description of the Background Art

Opto-electronic components, including fiber optics cables, connectors, transmitters, receivers, switches, routers and all other types of optical components, have become the backbone of the modern telecommunication infrastructure. Due to their extremely low error rate and wide bandwidth, optical communication systems have supported an explosion in the growth of data communication systems, such as the Internet. As the need for components in such systems increases, the need for accurate testing of these systems also increases.

Each component within an optical communication system must be tested to ensure that it meets technical standards that have been set in the industry. Additionally, the components must be tested to assess their performance in various real world conditions. This testing can be labor intensive, tedious and time consuming.

A known testing scheme 10 is shown in FIG. 1. The scheme 10 typically includes an optical transmitter 12, an optical attenuator 14, an optical monitor 16 and a receiver 18, such as an optical or electrical receiver. The device under test 25 (DUT) is placed between the transmitting side 20 (which comprises the transmitter 12, the attenuator 14 and the optical monitor 16) and the receiving side 22 (which comprises the receiver 18). All of these components are then interconnected with fiber optic cables and connectors.

In order to test the DUT 25, a technician energizes the optical transmitter 12 which transmits a test signal. The optical test signal is transmitted from the optical transmitter 12, through the optical attenuator 14, through the DUT 25 and is received by the receiver 18. The technician adjusts the gain of the optical attenuator 14 until the optical monitor 16 indicates that the output optical power is at a predetermined level for testing the DUT 25. The DUT 25 is tested at this predetermined optical power and the number of errors in the received signal is measured at the receiver 18. A bit error rate (BER) of the DUT 25 at the predetermined optical power is determined, in accordance with Equation 1:

$$BER = \frac{\text{errors}}{\text{total number of bits received}}. \quad (1)$$

This value is compared to a specified BER for that specific power level, to determine whether the DUT 25 meets the industry standard.

There are drawbacks to this approach. Although the test results at the specified power level may be acceptable, the DUT 25 may perform unexpectedly poor at other power levels, in particular higher power levels. To illustrate, a DUT 25 may be expected to have a BER of $10^{-9}$ at the specified power level. However, at a much greater power level, a well behaved DUT 25 may be expected to have a BER of $10^{-16}$. Although the DUT 25 may test at the specified power level with a BER of $10^{-9}$, it may have a BER of $10^{-10}$ at the higher power level. As a result, the DUT 25 in real world conditions would have an unacceptable performance.

To evaluate the DUT 25 for such conditions, the DUT 25 may be tested at other optical power levels. Using the BERs at these optical power levels, the BER measurements of the DUT 25 are plotted on log paper, as shown in FIG. 2 for example. The optical power in decibel milliwatts (dBm) is plotted on the horizontal axis against the logarithm to the base 10 ($\log_{10}$) of the BER on the vertical axis.

However, constructing these plots can be extremely time consuming and tedious. Additionally, testing using these logarithmic plots typically requires an engineer to evaluate the plotted relationships. As shown in FIG. 2, all of plotted data does not fall on straight line 28. As a result, the engineer must analyze the raw data to determine whether the error rate versus power relationship is an indicator of poor performance of the DUT 25, or merely an acceptable statistical deviation from the norm. This testing procedure is labor intensive and is susceptible to human error. Accordingly, it is desirable to have alternate approaches for error analysis of optical components.

SUMMARY OF THE INVENTION

The present invention is therefore directed to an error analysis tester and method for optical components, which substantially overcome one or more of the problems due to the limitations and disadvantages of the background art.

In accordance with an exemplary embodiment, an error analysis tester for optical components includes an optical transmitter that generates a test signal at a plurality of selected optical power levels; a port that outputs the test signal to an optical component and receives a version of the test signal from the optical component; a receiver that determines errors in the received version of the test signal at the plurality of selected optical power levels; a controller that sets data points of a function associated with an error rate of each of the selected optical power levels and determines a relationship between the determined errors and the set data points; and an interface that indicates a relationship between the determined errors with reference to the set data points.

In accordance with another exemplary embodiment of the present invention, a method of error analysis testing for optical components includes generating a test signal at a plurality of selected optical power levels; outputting the test signal to an optical component; receiving a version of the test signal from the optical component; determining errors in the received version of the test signal at the plurality of selected optical power levels; setting data points of a function associated with an error rate at each of the selected optical power levels in determining a relationship between the determined errors and the set data points; and providing indication of the relationship between the determined errors with reference to the set data points, wherein the function is defined as:

$$f(BER) = \log_{10}(\sqrt{2}\,erfc^{-1}(2 \cdot BER)),$$

wherein BER is bit error rate and $erfc^{-1}$ is an inverse complementary error function.

In accordance with another exemplary embodiment of the present invention, a portable error analysis tester for optical components includes a housing; an optical transmitter that generates a test signal at a plurality of selected optical power levels, the test signal being output to an optical component under test; an optical receiver that receives a version of the test signal from the optical component and determines errors in the received test signal at the plurality of selected optical power levels; and a controller that sets data points of a function associated with an error rate at each of the selected optical power levels and determines a relationship between the determined errors and the set data points.

BRIEF DESCRIPTION OF THE DRAWINGS

The invention should be best understood from the following detailed description when read with the accompanying drawings, which are presented merely as examples and which should not be construed as limiting. It should be understood that the various features in the figures are not necessarily drawn to scale. Also, the dimensions may be arbitrarily increased or decreased for clarity.

DETAILED DESCRIPTION OF THE PREFERRED EMBODIMENTS

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials are omitted for the sake of brevity.

Figure 1:
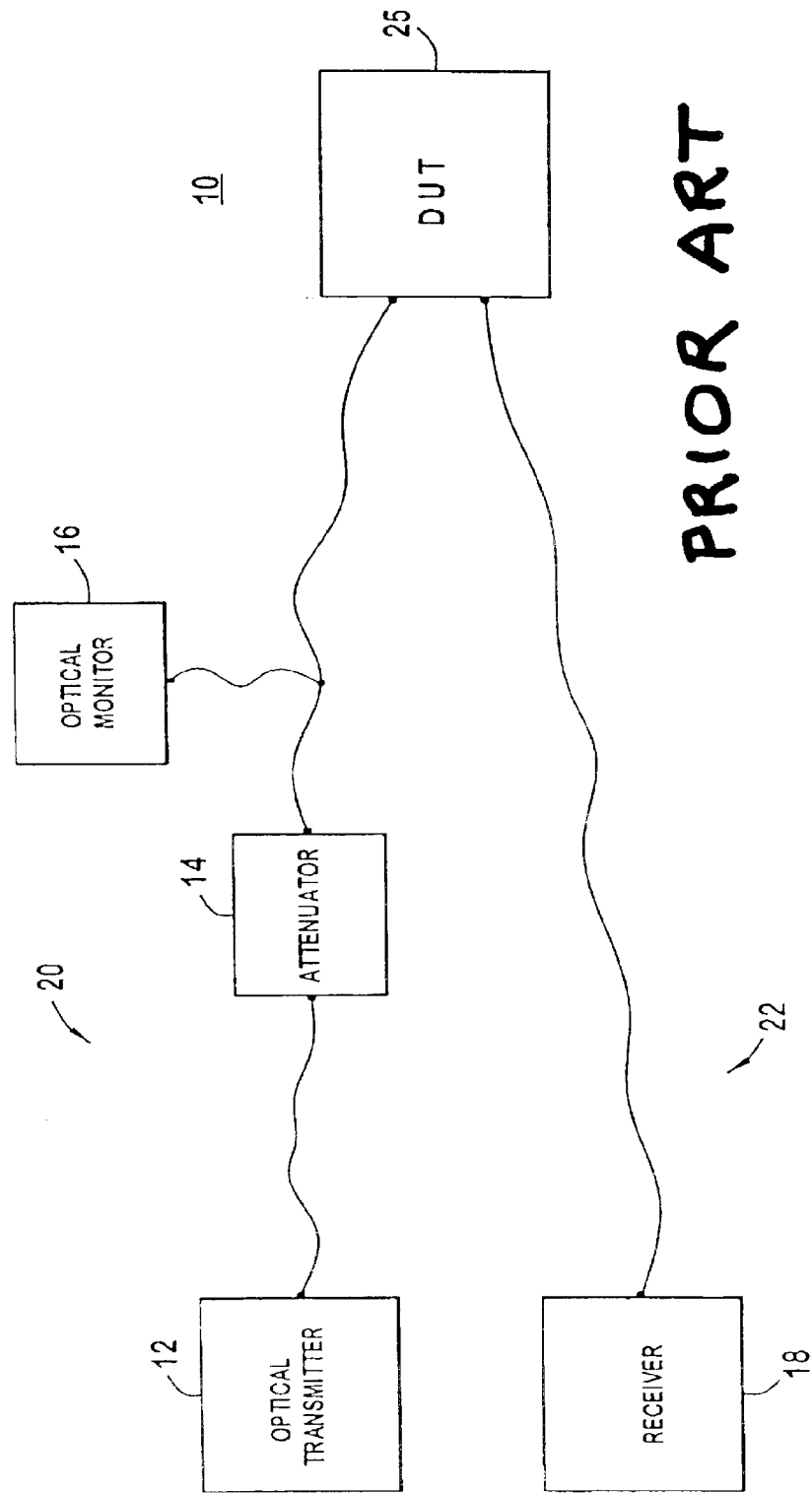
FIG. 1 is an illustration of a known testing scheme.
Figure 2:
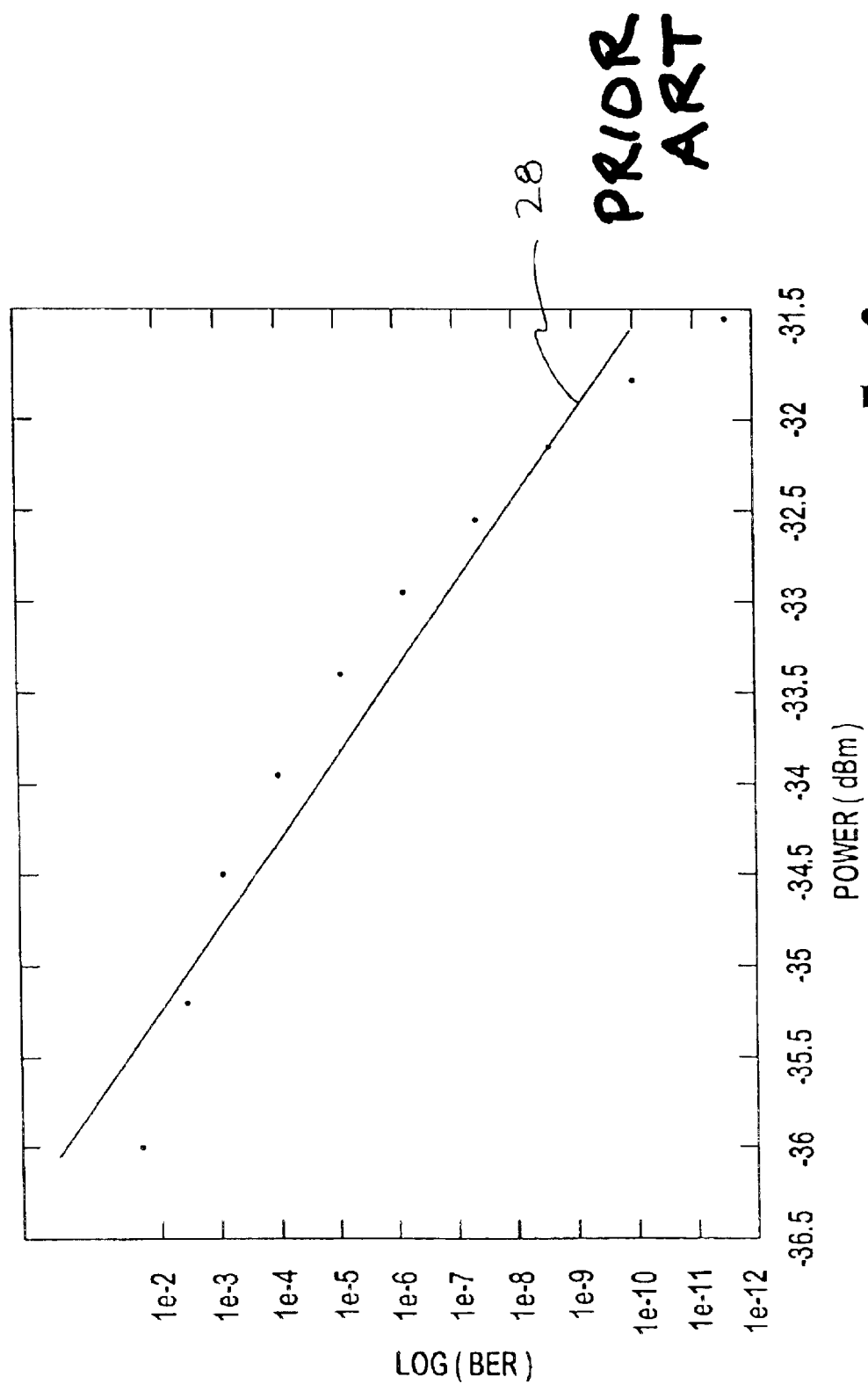
FIG. 2 is an illustration of a known plot of a logarithm of the bit error rate versus optical power in decibel milliwatts (dBm)
Figure 3:
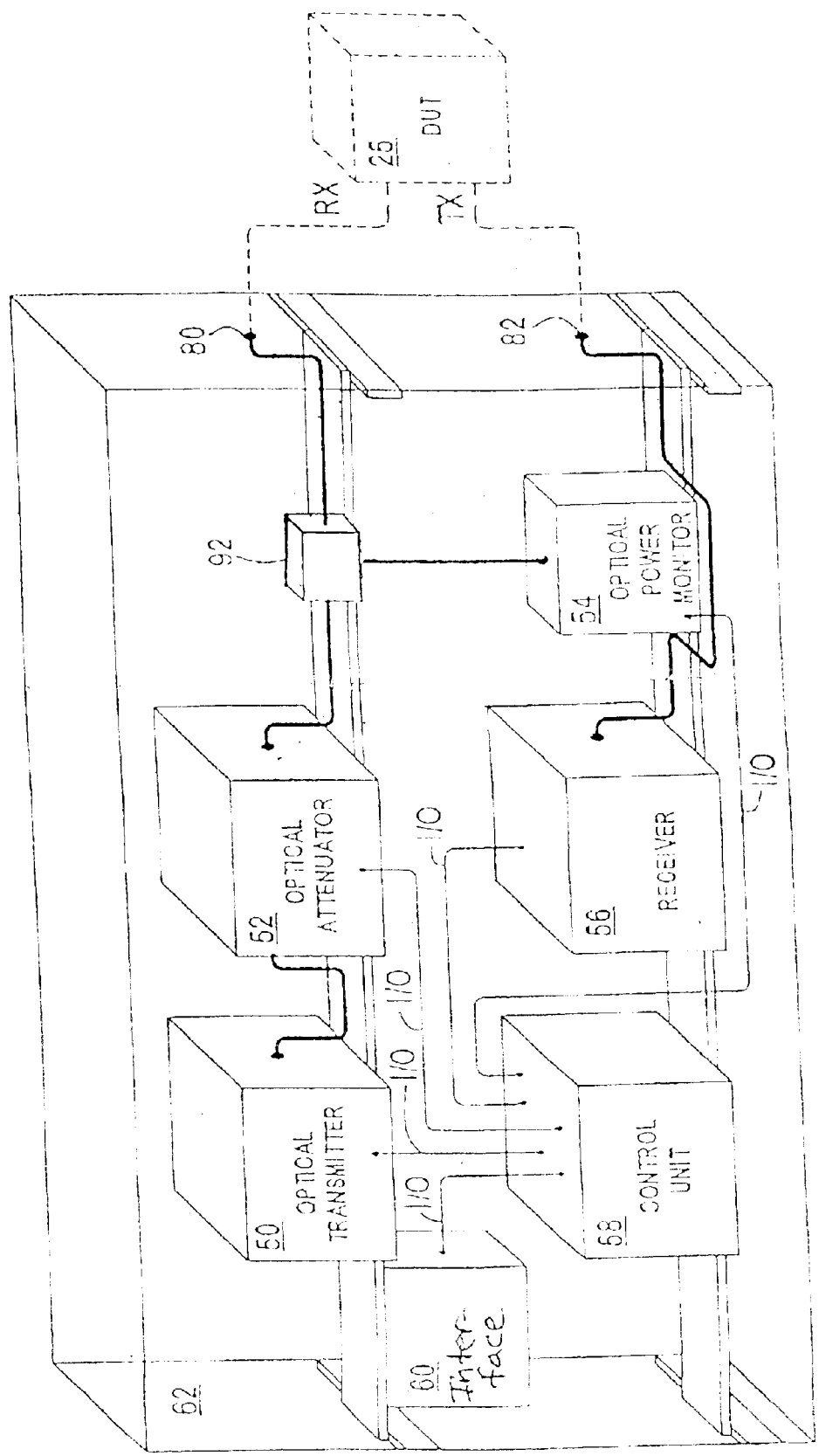
FIG. 3 is an illustration of an error analysis system of the present invention.

A system for error analysis of the invention is shown in FIG. 3. The system includes an optical transmitter 50, an optical attenuator 52, an optical power monitor 54, an optical receiver 56, a control unit microprocessor 58, an optical splitter 92 and a user interface 60. User interface 60 may be a graphical user interface for example, but in the alternative may be any type of user interface such as a keyboard or a mouse, a CRT screen and associated mouse for selecting different options on the screen, or a printer or device for sending e-mails of analysis results for display by a user via the Internet or a network system. Also, for convenience, all of the above noted components may be located in unitary housing or chassis 62 to be portable. Unitary housing 62 includes output port 80, which provides an output signal from optical alternator 52 via optical splitter 92 and along the corresponding optical cable, to DUT 25 connected thereto. Also, input port 82 of unitary housing 62 is coupled to DUT 25 and provides a signal therefrom to optical receiver 56 via the corresponding optical cable. Incidentally, an optical cable is also provided between optical splitter 92 and optical power monitor 54.

Each of the optical components 50–56 has a control input/output (I/O) that couples each optical component 50–56 with the control unit 58. These I/O control connections permit the control unit 58 to control all of the optical components 50–56 from a common point and also permit the output from each of the optical components 50–56 to be monitored by the control unit 58. Having a single control unit 58 also permits calibration of all of the optical components 50–56 from a common point of control, which allows for software instead of manual calibration. The control unit 58 also includes an I/O control interconnection (I/O) with the user interface 60, to permit the control unit 58 to communicate with the user interface 60 and also to accept user input via the user interface 60.

Figure 4:
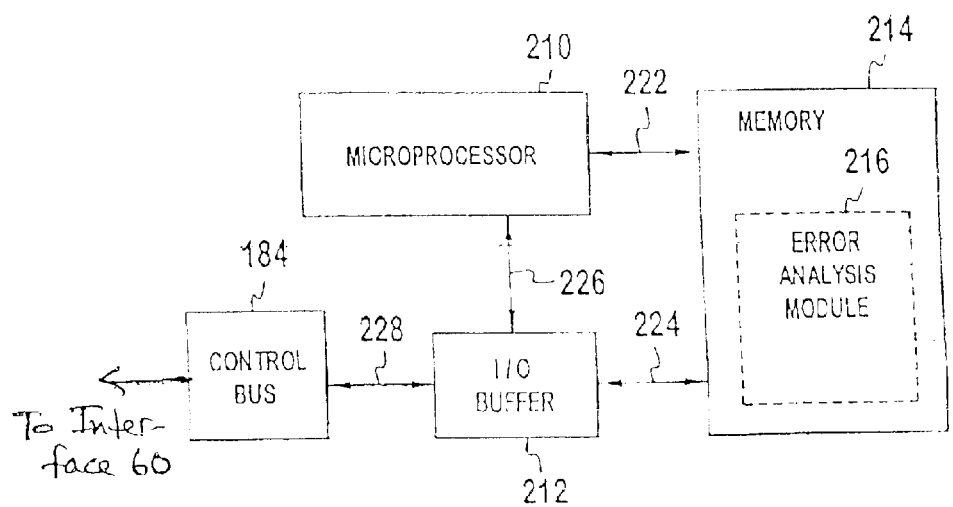
FIG. 4 is an illustration of a control unit of the error analysis system of FIG. 3.

FIG. 4 illustrates control unit 58 in greater detail. Control unit 58 includes a microprocessor 210, an input/output (I/O) buffer 212, and an associated memory 214. The memory 214 stores error analysis programming in error analysis module 216, and also stores other software and any other information such as the determined number of errors at each power level, which are required to be stored by the control unit 58. Several data buses 222, 224 and 226 facilitate the flow of data between the microprocessor 210, the memory 214 and the I/O buffer 212. Another data bus 228 facilitates the flow of data between the I/O buffer 212 and a control bus 184, whereby control bus 184 communicates with the user interface 60. Although the microprocessor 210 is illustrated herein as including an I/O buffer 212, in an alternative embodiment the microprocessor 210 could have direct access to the memory 214, to eliminate the need for the I/O buffer 212.

Figure 5:
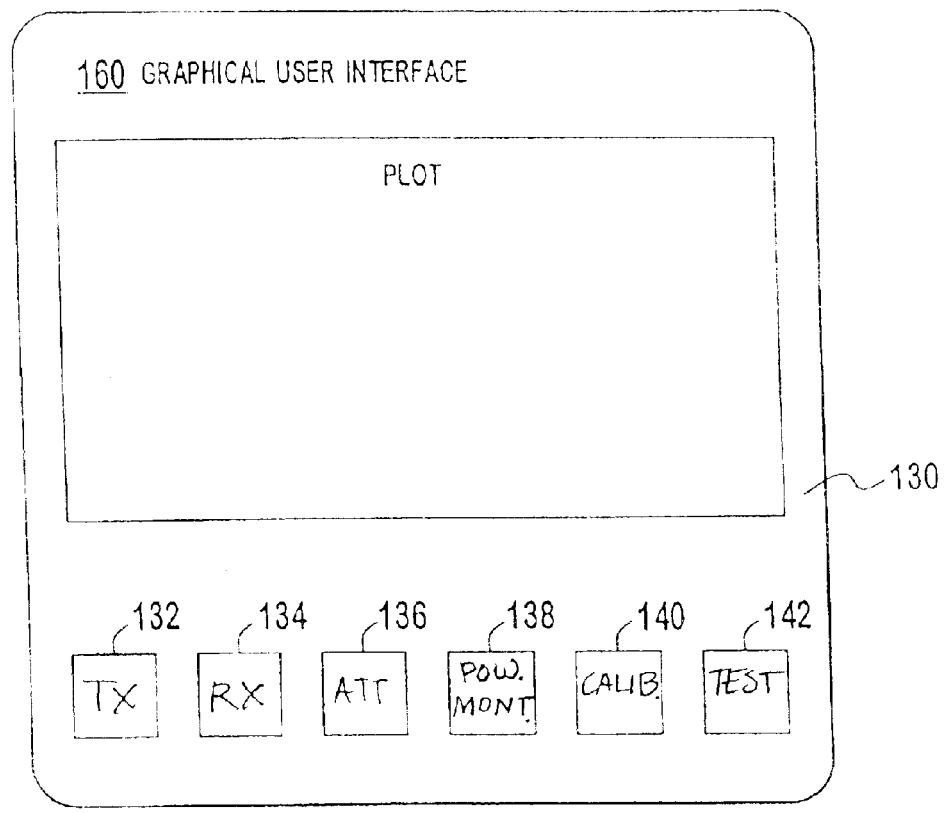
FIG. 5 is an illustration of a graphical user interface of the error analysis system of FIG. 3.

FIG. 5 shows the details of a graphical user interface used as user interface 160 in an embodiment of the invention. Graphical user interface 160 includes a touch-sensitive screen 130, which changes depending upon which of graphical buttons 132–142 are selected. For example, the graphical buttons may include transmitter button 132, receiver button 134, attenuator button 136, power monitor button 138, calibration routine button 140, and test routine button 142. However, it should be understood that different types and numbers of buttons 132–142 may be provided on screen 130 or programmed as desired by the user, to implement or control various functions or testing routines including the error analysis, and that the set up of screen 130 as illustrated in FIG. 5 should not be construed as limiting.

Figure 6:
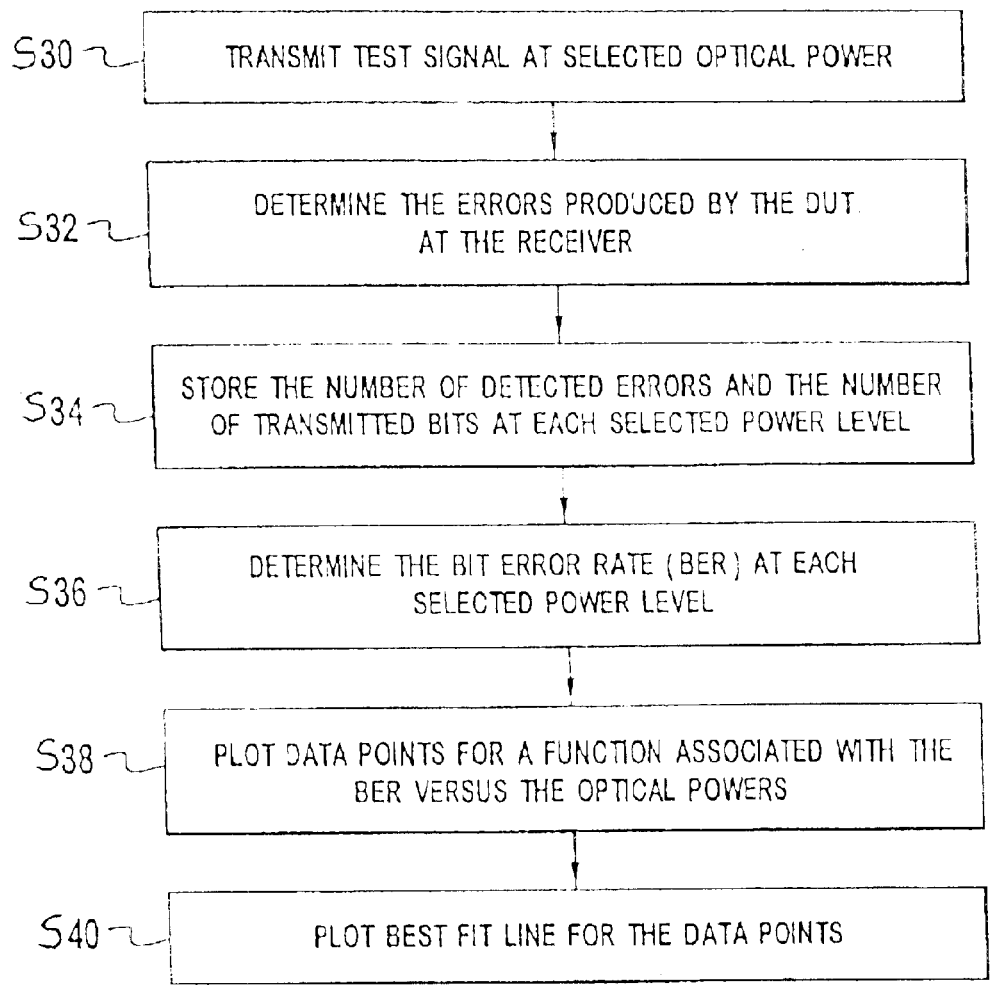
FIG. 6 is a flow chart of error analysis performed by the error analysis system of FIG. 3.

Testing of the DUT 25 will now be explained in conjunction with the flow chart of FIG. 6. In order to test DUT 25, the DUT 25 is connected to the ports 80 and 82 of the housing 60 by an operator. The operator selects test button 142 displayed on the screen 130 of the graphical user interface 160 illustrated in FIG. 5, for example. The control unit 58 initiates a test of the DUT 25 at various optical powers by controlling the optical attenuator 52. The signal returned by the DUT 25 may be optical, electrical or even acoustical. In the case of an electrical or acoustical signal, correspondingly appropriate cables and receivers would be incorporated into the system of FIG. 3. The test range used would depend on the type of DUT 25. A range of power levels for testing may be set either automatically or by user input. One possible user input range may be $10^{-4}$ or $10^{-5}$ BER to $10^{-10}$ BER, for example. If set automatically, the uppermost tested power level is determined by adjustment of the power level under control of control unit 58, until a point is found where some errors are made in a reasonable time period. A lowermost tested power level is determined by adjustment of the power level just prior to a point where an unreasonably high number of errors is made, such as in the range between $10^{-5}$ or $10^{-4}$ BER.

Accordingly, testing of DUT 25 is initiated by microprocessor 210 of control unit 58 by transmitting a test signal from optical transmitter 50 at selected optical powers within the corresponding range, in step S30. Although any number of test points can be selected, a typical range is 5–20 test points. The errors produced by the DUT 25 are thereafter determined at the receiver 56, in step S32. For example, optical transmitter 50 may transmit a predetermined test pattern, and optical receiver 56 would then compare the received pattern with the predetermined test pattern, to thus determine errors. The DUT 25 is tested at each of the selected power levels, until a specified number of errors is detected. A typical value for the number of errors is 10 errors. To prevent an extremely long test period at low error rates, a time limit may be set. The test is ended when either the specified number of errors is received or the time limit expires. However, the time limit may be overridden by the user. Alternately, the DUT 25 is tested at each power level for a specified time period, regardless of the measured number of errors.

The number of detected errors at each power level and the total number of bits received are stored in the memory 214, at step S34. The test parameters, such as testing power levels and number of errors detected at each power level, may be selected by a user input, although a default setting for these parameters may be used.

Figure 7:
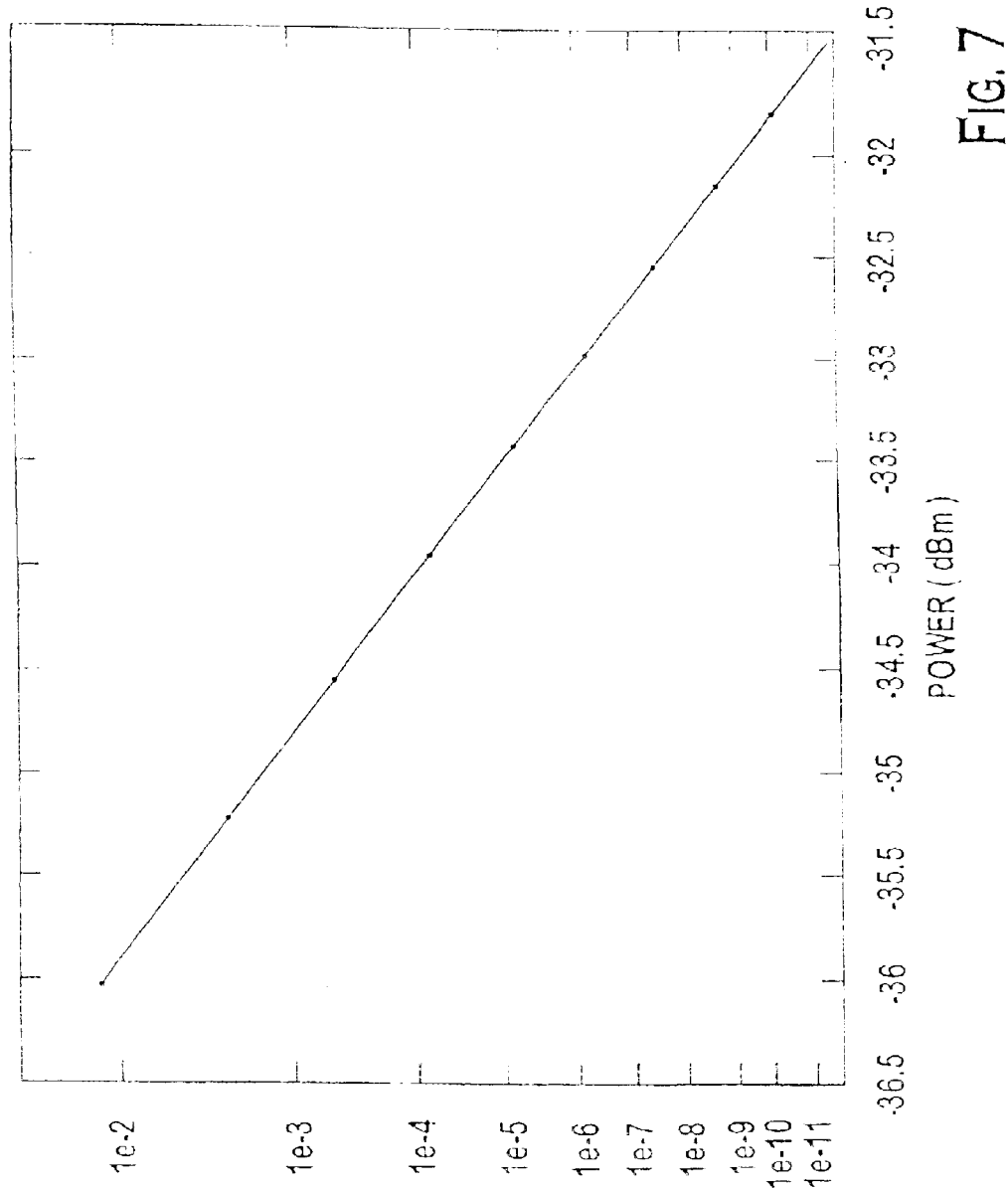
FIG. 7 is an illustration of a plot of a function associated with the BER versus optical power in dBm of the present invention.

When the requisite number of errors at each power level is accumulated, the BER is determined by the microprocessor 210, in step S36. The microprocessor 210 produces a plot of the information as shown in FIG. 7, to be displayed on the graphical user interface 60. The horizontal axis has units representing the optical power level, such as milliwatts or dBm. Along the vertical axis is a function associated with the BER, and which is linear in a "well behaved" DUT 25. Errors in a "well behaved" DUT 25 should be dominated by noise, which exhibits a gaussian distribution. Accordingly, one approach to produce a linear model is a version of a complementary error function associated with the BER. The accumulated data is converted into data points for plotting. The selected power levels and the associated BER function are determined. The resulting data points (associated BER function versus power) are plotted, in step S38. A line is drawn using a best fit approach, such as a least squares fit, in step S40.

Additionally, a linearity test may be performed on the tested results. The result of the linearity test may also be displayed on the graphical user interface 60, to provide a measure of discrepancy between the line drawn and the points provided.

Figure 8:
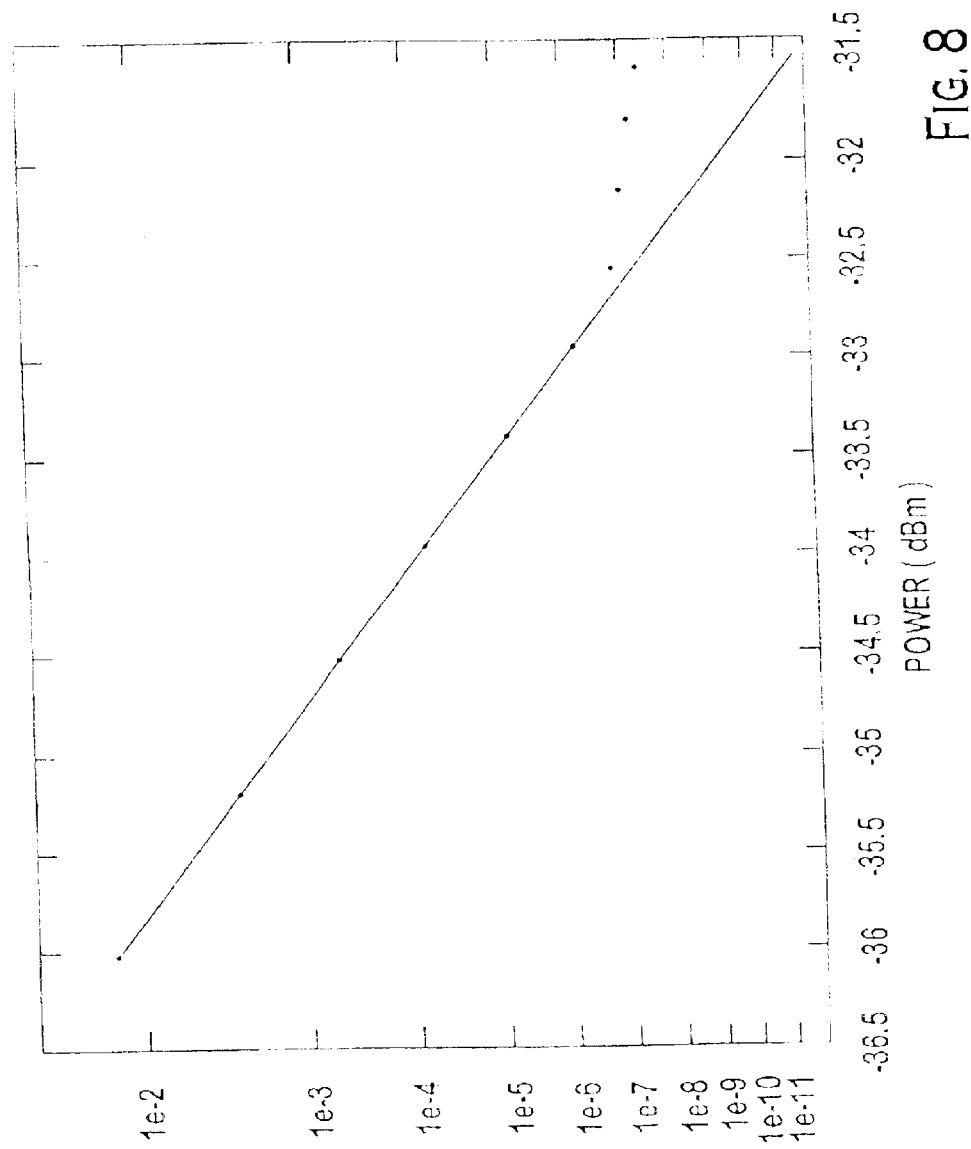
FIG. 8 is an illustration of a flattening curve.

By viewing the plotted data and the line, the technician can verify whether the device is functioning properly. If the data points are distant from the best fit line, this indicates that the device is not well behaved. If the data points are close to the line, this indicates that the device is well behaved. The flattening of the curve as shown in FIG. 8 is highly undesirable for a DUT 25. Such a curve suggests the existence of an "error floor." An "error floor" is a lower limit to the number of errors produced by an optical component independent of the optical power. This type of linearity analysis is much more important to a network designer than a sensitivity measurement. A DUT 25 can have an acceptable sensitivity but have an unacceptable "error floor." Additionally, if the DUT 25 yields a straight line plot, the network designer can have some confidence in its behavior. Adherence to a straight line suggests that the DUT 25 behaves well even at error rates far below those actually tested.

To explain the linear relationship between a complementary error function associated with the BER and the optical power in an example of the present invention, the following is provided. The effect of noise on a transmitted signal can be modeled statistically. An optical signal has symbols of one of two values, represented by a 0 and 1. When sending a one, the transmitter typically transmits light at a selected power level. When sending a zero, typically minimal or zero light is transmitted. At the receiver 56, the value of each received soft symbol is compared to a threshold value and a hard decision is made whether the received soft symbol is a one or a zero. When noise decreases a symbol representing a one to a level below the hard decision threshold, an error is made at the receiver. Similarly, when noise increases a symbol representing a zero to a level above the threshold, an error is also produced.

Received soft symbols produce two gaussian distributions. The mean $\mu_0$ and the mean $\mu_1$ respectively represent the mean of the power level of the zero soft symbol and the mean of the power level of the one soft symbol. The variances $\sigma_0^2$ and $\sigma_1^2$ represent the quantity of noise present at each level, respectively. The rate at which errors occur is related to the "closeness" of the decision threshold to the noisy zero or one level. This "closeness" is measured by the Q-factor for each level i, i=0 or 1, as in Equation 2:

$$Q_i = \frac{|D - \mu_i|}{\sigma_i}, \qquad (2)$$

wherein D represents the decision level.

To determine the proportion of zero soft symbols erroneously identified as a one $P_{01}$, the proportion of zero soft symbols above the hard decision value is determined. One approach to predict this proportion for a "well behaved" receiver is to use a gaussian distribution. For all zero symbols coming into the device, the fraction erroneously identified as ones $P_{01}$ is given by the fraction of the gaussian distribution (representing noise on the zeros) above the decision threshold D. This proportion $P_{01}$ is the area under the normalized gaussian between the decision threshold D and infinity $\infty$. This area can be determined using the complementary error function (erfc). Using the complementary error function, the proportion of erroneously identified ones $P_{01}$ is determined such as by Equation 3:

$$P_{01} = \frac{1}{2}\operatorname{erfc}\left(\frac{Q_0}{\sqrt{2}}\right). \qquad (3)$$

Similarly, the proportion of ones erroneously identified as zeros $P_{10}$ is determined such as by Equation 4:

$$P_{10} = \frac{1}{2}\operatorname{erfc}\left(\frac{Q_1}{\sqrt{2}}\right). \qquad (4)$$

By adding $P_{01}$ to $P_{10}$ the proportion of incorrectly identified symbols is determined. When the decision threshold D is halfway between the zero and one mean levels, the two Q-factors are equal, that is $Q_0=Q_1$. Using Q defined to equal $Q_0=Q_1$, the combined probability of an incorrectly identified symbol can be determined such as by Equation 5:

$$ErrProb = \frac{1}{2}\text{erfc}\left(\frac{Q}{\sqrt{2}}\right). \quad (5)$$

Accordingly, if the true BER performance obeys this theoretical result over a wide range of Q values, it suggests that the DUT 25 is "well behaved."

When the optical power level is varied during a test of the DUT 25, the mean value of the received one soft symbols $\mu_1$ will vary. The value of $\mu_1$ is proportional to the optical power level. Since often the decision threshold D and noise variances $\sigma_0^2$ and $\sigma_1^2$ are relatively fixed, the Q-factor is often directly proportional to optical power. As a result, a function error probability g(ErrProb) can be found such that g(ErrProb) versus Q is a straight line. Since the error probability is equivalent to the BER, Equation 6 or an analogous equation can be used:

$$f(BER) = \log_{10}(\sqrt{2}\,\text{erfc}^{-1}(2 \cdot BER)) \quad (6).$$

As a result, the plot of f(BER) versus the optical power in dBm should be linear for a "well behaved" DUT 25. Such a plot is shown in FIG. 7. The line in FIG. 7 is shown for illustrative purposes and may not actually be displayed.

The relationship of the logarithm of the BER to optical power in dBm is not a true linear relationship in a "well behaved" DUT 25. Such an approach is a crude approximation of a linear relationship. Accordingly, a function related to a BER function, such as Equation 6, is a better indicator of a well behaved DUT 25. Equation 6 is one illustrative example for deriving a BER function. Under varying conditions, the theoretical straightness of the plot is robust. Accordingly, this approach to analyzing optical components can be used in a variety of applications, such as electrical and acoustical.

The invention having been described in detail, it will be readily apparent to one having ordinary skill in the art that the invention may be varied in a variety of ways. Such variations are not to be regarded as a departure from the scope of the invention. All such modifications as would be obvious to one of ordinary skill in the art, having had the benefit of the present disclosure, are intended to be included within the scope of the appended claims and the legal equivalents thereof.

What is claimed is:

1. An error analysis tester for optical components, comprising:
    an optical transmitter that generates a test signal at a plurality of selected optical power levels;
    a port that outputs the test signal to an optical component and receives a version of the test signal from the optical component;
    a receiver that determines errors in the received version of the test signal at the plurality of selected optical power levels;
    a controller that sets data points of a function associated with an error rate at each of the selected optical power levels and determines a relationship between the determined errors and the set data points; and
    an interface that indicates the relationship between the determined errors with reference to the set data points.

2. The error analysis tester of claim 1, wherein said controller determines the relationship as between the determined errors with respect to a line corresponding to the set data points.

3. The error analysis tester of claim 1, wherein said interface comprises a graphical user interface that visually displays the relationship between the determined errors and the set data points as a plot.

4. The error analysis tester of claim 1, wherein the function is based on a gaussian distribution of test signal symbols with respect to a symbol decision threshold.

5. The error analysis tester of claim 1, wherein said transmitter comprises an optical attenuator.

6. The error analysis tester of claim 1, wherein the function is a complementary error function.

7. The error analysis tester of claim 1, housed within a chassis to be portable.

8. An error analysis tester for optical components, comprising:
    an optical transmitter that generates a test signal at a plurality of selected optical power levels;
    a port that outputs the test signal to an optical component and receives a version of the test signal from the optical component;
    a receiver that determines errors in the received version of the test signal at the plurality of selected optical power levels;
    a controller that sets data points of a function associated with an error rate at each of the selected optical power levels and determines a relationship between the determined errors and the set data points;
    an interface that indicates the relationship between the determined errors with reference to the set data points;
    wherein the function is defined as $$f(BER) = \log_{10}(\sqrt{2}\,erfc^{-1}(2 \cdot BER)),$$

wherein BER is bit error rate and $erfc^{-1}$ is an inverse complementary error function.

9. A method of error analysis testing for optical components, comprising:
    generating a test signal at a plurality of selected optical power levels;
    outputting the test signal to an optical component;
    receiving a version of the test signal from the optical component;
    determining errors in the received version of the test signal at the plurality of selected optical power levels;
    setting data points of a function associated with an error rate at each of the selected optical power levels and determining a relationship between the determined errors and the set data points; and
    providing indication of the relationship between the determined errors with reference to the set data points,
    wherein the function is defined as $$f(BER) = \log_{10}(\sqrt{2}\,erfc^{-1}(2 \cdot BER)),$$

wherein BER is bit error rate and $erfc^{-1}$ is an inverse complementary error function.

10. The method of error analysis testing of claim 9, wherein said determining is performed automatically by a system controller which determines the relationship as between the determined errors with respect to a line corresponding to the set data points.

11. The method of error analysis testing of claim 9, wherein said providing indication comprises visually displaying the relationship between the determined errors and the set data points as a plot on a graphical interface.

12. The method of error analysis testing of claim 9, wherein said generating comprises optical attenuating a base signal to provide the test signal at the plurality of selected optical power levels.

13. A portable error analysis tester for optical components, comprising:

a housing;

an optical transmitter that generates a test signal at a plurality of selected optical power levels, the test signal being output to an optical component under test;

an optical receiver that receives a version of the test signal from the optical component and determines errors in the received test signal at the plurality of selected optical power levels; and a controller that sets data points of a function associated with an error rate at each of the selected optical power levels and determines a relationship between the determined errors and the set data points.

14. The portable error analysis tester of claim 13, further comprising:

an interface that indicates the relationship between the determined errors with reference to the set data points.

15. The portable error analysis tester of claim 14, wherein said interface comprises a graphical user interface that visually displays the relationship between the determined errors and the set data points on a plot.

16. The portable error analysis tester of claim 14, wherein said controller determines the relationship as between the determined errors with respect to a line corresponding to the set data points.

17. A portable error analysis test for optical components, comprising:

a housing;

an optical transmitter that generates a test signal at a plurality of selected optical power levels, the test signal being output to an optical component under test;

an optical receiver that receives a version of the test signal from the optical component and determines errors in the received test signal at the plurality of selected optical power levels;

a controller that sets data points of a function associated with an error rate at each of the selected optical power levels and determines a relationship between the determined errors and the set data points;

wherein the function is defined as $$f(BER) = \log_{10}(\sqrt{2} \, erfc^{-1}(2 \cdot BER)),$$

wherein BER is bit error rate and $erfc^{-1}$ is an inverse complementary error function.

* * * * *